US011775313B2

(12) United States Patent
Culurciello et al.

(10) Patent No.: US 11,775,313 B2
(45) Date of Patent: Oct. 3, 2023

(54) HARDWARE ACCELERATOR FOR CONVOLUTIONAL NEURAL NETWORKS AND METHOD OF OPERATION THEREOF

(71) Applicant: Purdue Research Foundation, West Lafayette, IN (US)

(72) Inventors: Eugenio Culurciello, West Lafayette, IN (US); Vinayak Gokhale, West Lafayette, IN (US); Aliasger Zaidy, West Lafayette, IN (US); Andre Chang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 964 days.

(21) Appl. No.: 15/990,365

(22) Filed: May 25, 2018

(65) Prior Publication Data

US 2018/0341495 A1    Nov. 29, 2018

Related U.S. Application Data

(60) Provisional application No. 62/511,389, filed on May 26, 2017.

(51) Int. Cl.
*G06F 9/38* (2018.01)
*G06N 5/046* (2023.01)
(Continued)

(52) U.S. Cl.
CPC ............ *G06F 9/3895* (2013.01); *G06F 9/545* (2013.01); *G06N 3/04* (2013.01); *G06N 3/045* (2023.01);
(Continued)

(58) Field of Classification Search
CPC .......... G06N 3/04; G06N 3/063; G06N 5/046; G06F 9/3895; G06F 2212/454
See application file for complete search history.

(56) References Cited

U.S. PATENT DOCUMENTS 6,073,213 A  *  6/2000  Peled .................. G06F 12/0875
                                                              712/E9.056
6,609,189 B1 *  8/2003  Kuszmaul ............. G06F 9/3855
                                                              708/421
(Continued)

OTHER PUBLICATIONS

U.S. Appl. No. 62/445,493 (Year: 2017).*
(Continued)

*Primary Examiner* — George Giroux
(74) *Attorney, Agent, or Firm* — Maginot, Moore & Beck LLP

(57) ABSTRACT

An accelerator for processing of a convolutional neural network (CNN) includes a compute core having a plurality of compute units. Each compute unit includes a first memory cache configured to store at least one vector in a map trace, a second memory cache configured to store at least one vector in a kernel trace, and a plurality of vector multiply-accumulate units (vMACs) connected to the first and second memory caches. Each vMAC includes a plurality of multiply-accumulate units (MACs). Each MAC includes a multiplier unit configured to multiply a first word that of the at least one vector in the map trace by a second word of the at least one vector in the kernel trace to produce an intermediate product, and an adder unit that adds the intermediate product to a third word to generate a sum of the intermediate product and the third word.

13 Claims, 11 Drawing Sheets

(51) Int. Cl.
G06N 3/04 (2023.01)
G06N 3/063 (2023.01)
G06N 3/045 (2023.01)
G06F 9/54 (2006.01)
G06N 3/08 (2023.01)

(52) U.S. Cl.
CPC .............. *G06N 3/063* (2013.01); *G06N 3/08* (2013.01); *G06N 5/046* (2013.01); *G06F 2212/454* (2013.01)

(56) References Cited

U.S. PATENT DOCUMENTS

| | | | | |
|---|---|---|---|---|
| 2001/0049782 | A1* | 12/2001 | Hsu | G06F 9/3844 |
| | | | | 712/237 |
| 2008/0114964 | A1* | 5/2008 | Davis | G06F 9/3808 |
| | | | | 712/E9.056 |
| 2017/0344882 | A1* | 11/2017 | Ambrose | G06N 3/0454 |
| 2018/0157465 | A1* | 6/2018 | Bittner | G06F 7/483 |
| 2018/0157961 | A1* | 6/2018 | Henry | G06N 3/04 |
| 2018/0197067 | A1* | 7/2018 | Mody | G06N 3/063 |

OTHER PUBLICATIONS

Gonzalez et al. (Trace-level reuse, Sep. 1999, pp. 1-8) (Year: 1999).*
Yu et al. (Vector Processing as a Soft Processor Accelerator, Jun. 2009, pp. 1-34) (Year: 2009).*
Luo et al. (Architecture and Implementation of a Vector MAC Unit for Complex No. 2014, pp. 1-6) (Year: 2014).*
Krizhevsky, A., "One weird trick for parallelizing convolutional neural networks," CoRR, 2014, vol. abs/1404.5997, http://arxiv.org/abs/1404.5997.
Szegedy, C. et al., "Going deeper with convolutions," in The IEEE Conference on Computer Vision and Pattern Recognition (CVPR), Jun. 2015.
He, K. et al., "Deep residual learning for image recognition," CoRR, vol. abs/1512.03385, 2015, http://arxiv.org/abs/1512.03385.
Han, S. et al., "Deep compression: Compressing deep neural networks with pruning, trained quantization and fluffman coding," International Conference on Learning Representations (ICLR), 2016.
Y. H. Chen, T. Krishna, J. S. Emer, and V. Sze, "Eyeriss: An energy-efficient reconfigurable accelerator for deep convolutional neural networks," IEEE Journal of Solid-State Circuits, vol. 52, pp. 127-138, Jan. 2017.
Cavigelli, L. et al., "Origami: A convolutional network accelerator," in Proceedings of the 25th Edition on Great Lakes Symposium on VLSI, ser. GLSVLSI, 2015, pp. 199-204, New York, NY, USA, http://doi.acm.org/10.1145/2742060.2743766.
Qui, J. et al., "Going deeper with embedded fpga platform for convolutional neural network," in Proceedings of the 2016 ACM/SIGDA International Symposium on Field-Programmable Gate Arrays, ser. FPGA 2016, pp. 26-35, New York, NY USA, http://doi.acm.org/10.1145/2847263.2847265.
Gupta, S. et al., "Deep learning with limited numerical precision," in ICML, 2015, pp. 1737-1746.
Zhang, C. et al., "Optimizing fpga-based accelerator design for deep convolutional neural networks," in Proceedings of the 2015 ACM/SIGDA International Symposium on Field-Programmable Gate Arrays, ser. FPGA 2015, pp. 161-170, New York, NY, USA, http://doi.acm.org/10.1145/2684746.2689060.
Zhang, C. et al., "Caffeine: Towards uniformed representation and acceleration for deep convolutional neural networks," in Proceedings of the 35th International Conference on Computer-Aided Design, ser. ICCAD 2016, pp. 12:1-12:8, New York, NY, USA, http://doi.acm.org/10.1145/2966986.2967011.
Szegedy, C. et al., "Rethinking the inception architecture for computer vision," CoRR, vol. abs/1512.00567, 2015.
Long, J. et al., "Fully convolutional networks for semantic segmentation," in The IEEE Conference on Computer Vision and Pattern Recognition (CVPR), Jun. 2015.
Wu, Z. et al., "Wider or deeper: Revisiting the resnet model for visual recognition," CoRR, vol. abs/1611.10080, 2016.
Conneau, A. et al., "Very deep convolutional networks for text classification," arXiv preprint arXiv:1606.01781, 2016.
Lecun, Y. et al., "Gradient-based learning applied to document recognition," in Intelligent Signal Processing, pp. 306-351, IEEE Press, 2001.
Russakovsky, O. et al., "ImageNet Large Scale Visual Recognition Challenge," International Journal of Computer Vision (IJCV), 2015, pp. 211-252, vol. 115, No. 3.
He, K. et al., "Delving deep into rectifiers: Surpassing human-level performance on imagenet classification," CoRR, vol. abs/1502.01852, 2015.
Szegedy, C. et al., "Inception-v4, inception-resnet and the impact of residual connections on learning," CoRR, vol. abs/1602.07261, 2016.
Iandola, F. N. et al., "Squeezenet: Alexnet-level accuracy with 50x fewer parameters and <1mb model size," CoRR, vol. abs/1602.07360, 2016.
Han, S. et al., "Eie: Efficient inference engine on compressed deep neural network," International Conference on Computer Architecture (ISCA), 2016.
Han, S. et al., "Learning both weights and connections for efficient neural network," in Advances in Neural Information Processing Systems (NIPS), 2015, pp. 1135-1143.
Chen, T. et al., "Diannao: A small-footprint high-throughput accelerator for ubiquitous machine-learning," in Proceedings of the 19th International Conference on Architectural Support for Programming Languages and Operating Systems, ASPLOS 2014, (New York, NY, USA), pp. 269-284.
Du, Z. et al., "Shidiannao: Shifting vision processing closer to the sensor," in Proceedings of the 42Nd Annual International Symposium on Computer Architecture, ISCA 2015, pp. 92-104, New York, NY, USA.
Krizhevsky, A. et al., "Imagenet classification with deep convolutional neural networks," in Advances in Neural Information Processing Systems (F. Pereira, C. J. C. Burges, L. Bottou, and K. Q. Weinberger, eds.), 2012, pp. 1097-1105, Curran Associates, Inc.
Simonyan, K. et al., "Very deep convolutional networks for large-scale image recognition," CoRR, 2014, vol. abs/1409.1556.
Gokhale, V. et al., "A 240 g-ops/s mobile coprocessor for deep neural networks," in Proceedings of the IEEE Conference on Computer Vision and Pattern Recognition Workshops, 2014, pp. 682-687.
Farabet, C. et al., "Bio-inspired vision processor for ultra-fast object categorization," in Proc. High Performance Embedded Computing Workshop, 2010.
Chen, Y.-H. et al., "Eyeriss: A spatial architecture for energy-efficient dataflow for convolutional neural networks," SIGARCH Comput. Archit. News, Jun. 2016, pp. 367-379, vol. 44.
Meloni, P. et al., "Curbing the roofline: A scalable and flexible architecture for cnns on fpga," in Proceedings of the ACM International Conference on Computing Frontiers, CF 2016, pp. 376-383, New York, NY, USA.
Azarkhish, E. et al., "Neurostream: Scalable and energy efficient deep learning with smart memory cubes," CoRR, vol. abs/1701.06420, 2017.

* cited by examiner

ALEXNET

| Layer # | Ops (M-ops) | Theor. Time (ms) | Actual Time (ms) | Perf. (G-ops/s) | Eff. % |
|---|---|---|---|---|---|
| 1 | 139 | 1.09 | 1.56 | 87.4 | 69.87 |
| 2 | 409 | 3.19 | 3.22 | 127.0 | 99.07 |
| 3 | 202 | 1.58 | 1.59 | 127.0 | 99.37 |
| 4 | 269 | 2.10 | 2.16 | 126.3 | 97.22 |
| 5 | 179 | 1.40 | 1.42 | 125.2 | 98.59 |
| Total | 1198.00 | 9.36 | 9.95 | 120.3 | 94.07 |

GOOGLENET

| Layer # | Ops (M-ops) | Theor. Time (ms) | Actual Time (ms) | Perf. (G-ops/s) | Eff. % |
|---|---|---|---|---|---|
| Layer 1 | 236 | 1.84 | 2.50 | 94.4 | 73.7% |
| Layer 2 | 756 | 5.49 | 5.64 | 134.0 | 97.3% |
| Inception 3a | 256 | 2.25 | 2.59 | 98.9 | 80.9% |
| Inception 3b | 609 | 4.98 | 5.22 | 116.6 | 95.4% |
| Inception 4a | 147 | 1.28 | 1.45 | 101.5 | 88.3% |
| Inception 4b | 176 | 1.49 | 1.69 | 104.0 | 88.2% |
| inception 4c | 214 | 1.66 | 1.87 | 114.4 | 88.8% |
| inception 4d | 237 | 1.92 | 2.03 | 116.8 | 94.6% |
| Inception 4e | 340 | 2.68 | 2.84 | 119.7 | 94.4% |
| Inception 5a | 112 | 0.78 | 0.83 | 134.9 | 94.0% |
| Inception 5b | 141 | 1.04 | 1.09 | 129.7 | 95.4% |
| Total | 3224 | 25.41 | 27.75 | 116.2 | 91.6% |

RESNET-50

| Layer # | Ops (M-ops) | Theor. Time (ms) | Actual Time (ms) | Perf. (G-ops/s) | Eff. % |
|---|---|---|---|---|---|
| conv_1 | 232 | 1.81 | 2.76 | 84.1 | 65.7% |
| conv_2 | 1165 | 9.10 | 9.37 | 124.4 | 97.2% |
| conv_3 | 1857 | 14.51 | 14.93 | 124.4 | 97.2% |
| conv_4 | 2388 | 18.66 | 20.55 | 116.2 | 97.0% |
| conv_5 | 1235 | 9.65 | 10.63 | 116.2 | 97.0% |
| Total | 6879 | 53.72 | 56.25 | 122.3 | 95.5% |

| | Eyeriss[26] | | Zhang[27] | Caffeine[18] | Qiu[19] | HWCE[28] | ACCELERATOR 100 | | |
|---|---|---|---|---|---|---|---|---|---|
| Platform | AlexNet 65nm CMOS | VGG 65nm CMOS | AlexNet VX485T | VGG KU060 | VGG Zynq 7045 | AlexNet Zynq 7045 | AlexNet Zynq 7045 | GoogLeNet Zynq 7045 | ResNet-50 Zynq 7045 |
| Clock (MHz) | 200 | 200 | 100 | 200 | 150 | 100 | 250 | 250 | 250 |
| Precision | 16-bit fixed | 16-bit fixed | 32-bit float | 16-bit fixed | 16-bit fixed | 16-bit fixed | 16-bit fixed | 16-bit fixed | 16-bit fixed |
| MAC Units | 168 | 168 | 448 | 1058 | 780 | 80 | 256 | 256 | 256 |
| Actual Perf. (G-ops/s) | 46.1 | 24.5 | 61.6 | 310.0 | 187.8 | 140.8 | 120.3 | 116.2 | 122.3 |
| Peak Perf. (G-ops/s) | 67.2 | 67.2 | 89.6 | 423.2 | 224 | 160 | 128 | 128 | 128 |
| Frame Rate (fps) | 38.3 | 0.8 | 51.3 | 268.3 | 6.3 | 117.3 | 109.3 | 36.3 | 17.7 |
| Power (W) | 0.278 | 0.236 | 18.61 | 25 | 9.63 | - | 9.48 | 9.53 | 9.61 |
| Energy Eff. (G-ops/J) | 164.0 | 102.1 | 3.3 | 12.4 | 19.3 | - | 12.7 | 12.2 | 12.7 |
| Computational Eff. | 69% | 36% | 69% | 73% | 80% | 88% | 94% | 91% | 95% |

FIG. 8

HARDWARE ACCELERATOR FOR CONVOLUTIONAL NEURAL NETWORKS AND METHOD OF OPERATION THEREOF

CLAIM OF PRIORITY

This application claims priority to U.S. Provisional Application No. 62/511,389, which is entitled "Software Architecture And Method Of Computing Data Therein," and was filed on May 26, 2017, the entire contents of which are hereby incorporated herein by reference.

GOVERNMENT LICENSE RIGHTS

This invention was made with government support under contract N00014-12-1-0167 awarded by the Office of Naval Research. The government has certain rights in the invention.

TECHNICAL FIELD

This disclosure relates generally to the field of machine learning and, more particularly, to hardware architectures that implement convolutional neural networks.

BACKGROUND

Convolutional neural networks (CNNs) have emerged as the model of choice for a wide range of machine-learning applications including object detection, classification, semantic segmentation and natural language processing tasks. CNNs are feed-forward hierarchical models named after the eponymous convolution operator. The levels of hierarchy in a CNN are called the layers of the network. The inputs and outputs of CNN layers are usually three dimensional. A typical CNN model contains several layers. Typical CNNs use as input an image, with its red, green and blue channels split into three separate two dimensional input feature maps. Three convolutional filters, one per channel, perform two dimensional convolutions on the input maps to produce three outputs. Finally, these outputs are combined by pixel-wise addition into a single two dimensional output called an output feature map. Multiple such filters are convolved with the same input to produce multiple output maps. The output of each layer in a CNN becomes the input to the next layer.

FIG. 9 depicts standard models of CNNs. The diagram 900 in FIG. 9 depicts the operation of a single layer of a CNN. The layer shown in the FIG. 9 has iC input maps of width iW and height iH each. There are as many three dimensional convolutional kernels as output maps, which in the diagram 900 is equal to oC. Each three-dimensional kernel has dimensions iC×kH×kW. The elements of the convolutional kernels are called weights. An output map is computed by first performing two-dimensional convolution on each input map. The resulting iC two dimensional outputs are added together by performing pixel-wise addition into a single two dimensional output feature map. This process is repeated by another three dimensional kernel oC times to produce all the output feature maps. This operation is expressed mathematically as $\text{ofm}(x,y,z_o) = \sum_{z_i=1}^{iC} \sum_{k_y}^{kH} \sum_{k_x}^{kW} \text{ifm}(x+k_x, y+k_y, z_i) \times w(x,y,z_i, z_o)$ where $\text{ofm}(x,y,z_o)$ and ifm$(x+k_x, y+k_y, z_i)$ are the output feature maps (ofm) and input feature maps (ifm), respectively, and the term $w(x, y, z_i, z_o)$ represents the four-dimensional weights of the layer.

Some convolutional layers are followed by a downsampling operation. This serves to reduce the computational complexity in the network. The most commonly used downsampling operation is called spatial max pooling (maxpool). Max pooling performs the max operation over a two dimensional P×P window and produces a single output pixel. If the window has a stride of s in both dimensions, it results in a downsampling of the feature maps by a factor of $s^2$. Some networks use average pooling instead of (or along with) max pooling. The diagram 950 in FIG. 9 depicts an example of outputs in a multi-layer CNN that receives three planes of an input image 954. The planes correspond to the red-green-blue color channels in a standard photographic image. The CNN includes a sequence of convolutional layers that produce data inputs and outputs 958A-958E. The outputs of some of the convolutional layers are downsampled using max pooling to produce downsampled data outputs 962A-962C that reduce the number of elements in the output starting from the original image data 954. The CNN in the diagram 950 includes output data sets 958A-958E with different dimensions. The CNN further includes fully-connected outputs 966A-966C that produce a final output vector that includes a predetermined number of elements (e.g. 1000 elements in FIG. 9). The final output of the CNN is, for example, provided to a classifier that identifies the contents of the original image based on a maximum probability classification of the contents of the final output. While not expressly shown in FIG. 9, the CNN structure also applies a non-linear function to the outputs 958A-958E and the fully-connected outputs 966A-966C. Some CNN models use the sigmoid or hyperbolic tangent functions for the non-linearity. More recently, the rectified linear unit (ReLU) has become the non-linear function of choice, primarily because it facilitates faster training of CNN models. ReLU sets negative inputs to zero and keeps non-negative inputs unchanged.

While CNNs report high accuracy for object detection and classification tasks, they also have high computational complexity. This fact, combined with their recent success has resulted in a large number of custom architectures that take advantage of the inherent parallelism in the convolution operator. However, the highly varied data access patterns in CNNs make it difficult for custom architectures to achieve high computational efficiency while processing a network. In this context, the term computational efficiency refers to the ratio of actual number of operations processed to the theoretical maximum number of operations the design can process within a given time, expressed as a percentage. This translates to the ratio of actual frames per second (FPS) of input data that can practically be processed compared to a theoretical FPS for a given CNN.

Some existing hardware and software systems implement accelerators that are specifically configured to process CNNs in an efficient manner. Most recent accelerators comprise a collection of processing elements (PEs) and some scratch-pad memory. While the existing CNN accelerators can help to improve the performance of CNN computation, these accelerators often process certain layers of commonly used CNN models with high efficiency while having substantially lower efficiency in other parts, which produces a lower overall level of efficiency for the entire CNN model. Thus, the prior art hardware and software acceleration architectures encounter challenges in processing complex CNNs with high computational efficiency. Consequently, improvements to accelerators that enable processing of CNNs with higher computational efficiency would be beneficial.

SUMMARY

Convolutional neural networks (CNNs) are a type of deep neural network that achieve high accuracy for a wide variety of applications including object detection, classification, semantic segmentation and natural language processing. CNNs are hierarchical mathematical models comprising billions of operations to produce an output. The high computational complexity combined with the inherent parallelism in these models makes them an excellent target for custom accelerators. The embodiments disclosed herein are directed to hardware accelerators for CNNs that provide a scalable, efficient low-power accelerator that is agnostic to CNN architectures. The embodiments described herein provide an efficient architecture for an accelerator that implements CNNs that is able to achieve an efficiency of 91% on AlexNet and GoogLeNet and over 95% in ResNet-50, which are examples of CNNs with significantly varied data access patterns and layer sizes. An illustrative example of the embodiments described herein is implemented using an Xilinx Zynq XC7Z045 APSoC. On this platform, the accelerator is capable of achieving 128 G-ops/s while consuming 9.48 W of power. This translates to a throughput and energy efficiency of 98 frames per second and 10.3 frames per joule, respectively, on the AlexNet CNN model and 34 frames per second and 3.6 frames per joule on the GoogLeNet CNN model.

In one embodiment, an accelerator for processing of a convolutional neural network (CNN) has been developed. The accelerator includes a compute core. The compute core includes a plurality of compute units. Each compute unit includes a first memory cache configured to store at least one vector in a map trace, the map trace corresponding to a contiguous set of input data in an input map for one layer of the CNN, a second memory cache configured to store at least one vector in a kernel trace, the kernel trace corresponding to a contiguous set of weights in a kernel of a convolutional layer or a fully-connected layer of the CNN, and a plurality of vector multiply-accumulate units (vMACs) connected to the first memory cache and the second memory cache. Each vMAC includes a plurality of multiply-accumulate units (MACs), each MAC including a multiplier unit configured to multiply a first word that forms a portion of the at least one vector in the map trace in the first memory cache by a second word that forms a portion of the at least one vector in the kernel trace in the second memory cache to produce an intermediate product, and an adder unit that adds the intermediate product to a third word to generate a sum of the intermediate product and the third word as an output.

In another embodiment, a method of operating an accelerator for processing of a convolutional neural network (CNN) has been developed. The method includes loading, with a control core in the accelerator, at least one vector in a map trace into a first memory cache in a compute core in the accelerator, the map trace corresponding to a contiguous set of input data in a plurality of input maps for one layer of the CNN, loading, with the control core, at least one vector in a kernel trace into a second memory cache in the compute core in the accelerator, the kernel trace including a plurality of vectors of weight values corresponding to a contiguous set of weights in a kernel of a convolutional layer or a fully-connected layer of the CNN, and operating a plurality of multiply-accumulate units (MACs) in a plurality of vector multiply-accumulate units (vMACs) in the compute core that are connected to the first memory cache and the second memory cache to implement a portion of the convolutional layer or the fully-connected layer in the CNN. The operating of each MAC further includes multiplying, with a multiplier unit in the MAC, a first word that forms a portion of the at least one vector in the map trace in the first memory cache by a second word that forms a portion of the at least one vector in the kernel trace in the second memory cache to produce an intermediate product, and adding, with an adder unit in the MAC, the intermediate product to a third word to generate a sum of the intermediate product and the third word as an output.

BRIEF DESCRIPTION OF THE DRAWINGS

FIG. 7A is a table that depicts performance and computational efficiency for an embodiment of the accelerators of FIG. 1 and FIG. 2 implementing the AlexNet CNN model.

FIG. 7B is a table that depicts performance and computational efficiency for an embodiment of the accelerators of FIG. 1 and FIG. 2 implementing the GoogLeNet CNN model.

FIG. 8 is a table that depicts the computational efficiency of an embodiment of the accelerators of FIG. 1 and FIG. 2 compared to prior art hardware and software convolutional neural network implementations in the AlexNet, GoogLeNet, and ResNet-50 CNN models.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

Figure 9:
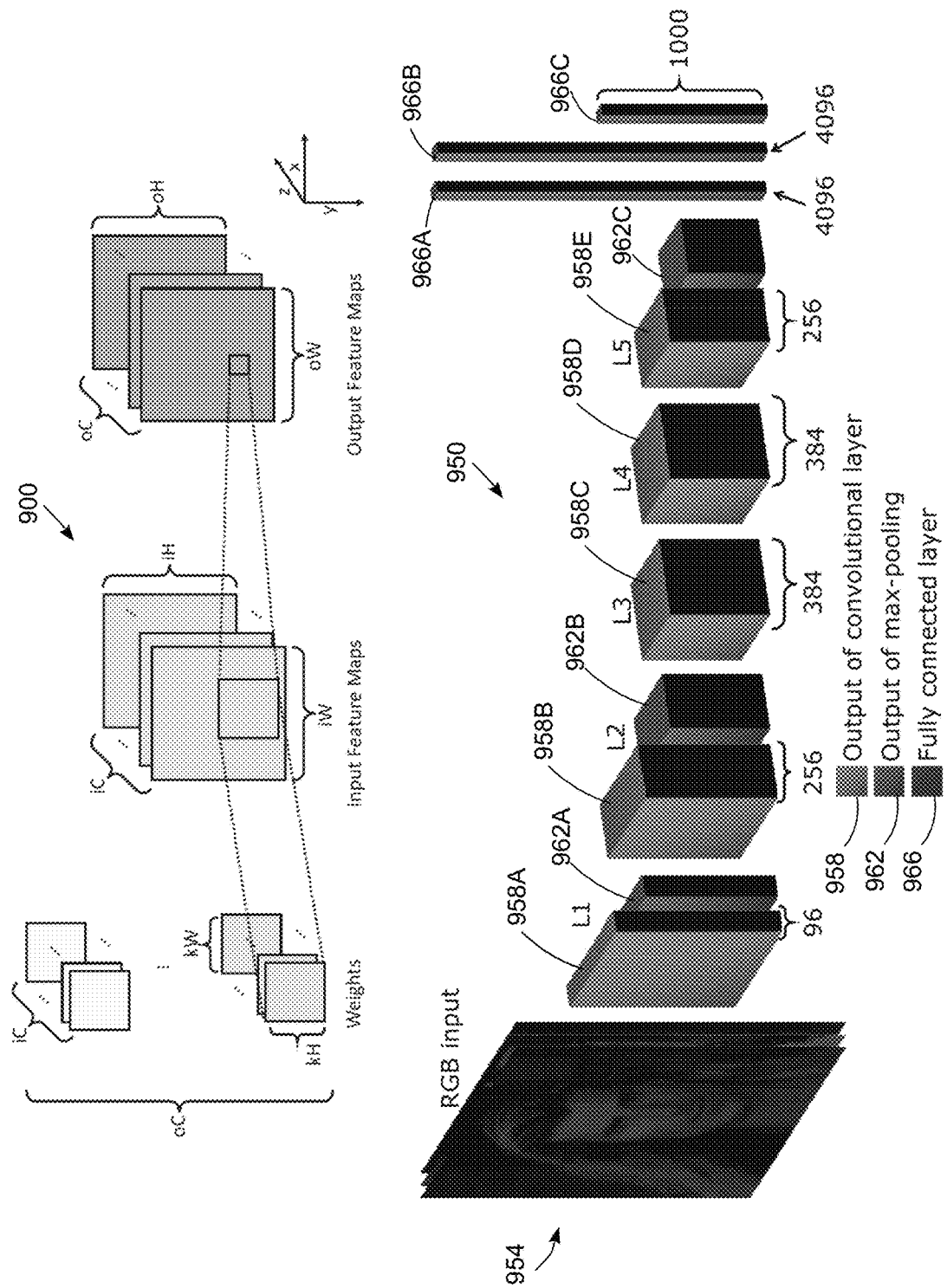
FIG. 9 shows prior-art diagrams of the general structure of a convolutional neural network.

This disclosure makes reference to CNN models that are well-known to the art for use as test references. These models include AlexNet, GoogLeNet, and ResNet-50. AlexNet implements a CNN with "conventional" layers similar to those shown in FIG. 9 with iC input maps, oC output maps and oC three dimensional kernels, each of which has dimensions iC×kH×kW. GoogLeNet implements "inception modules" and ResNet-50 implements "residual modules" that are described in more detail below. The accelerator embodiments described herein provide improvements to the computational efficiency of each of these existing CNN models and other CNN models.

The inception modules use different kernel sizes on the same input maps volume. An inception module requires a three dimensional input of dimensions iC×iH×iW, just like conventional layers. However, it first applies three different groups of iC×1×1 kernels on this volume to produce three different branches of output map volumes. Two of these volumes have two differently sized kernels applied to them—the first has 3×3 kernels applied and the second uses 5×5. The depth of the kernels is equal to the number of maps in that branch. Finally, the original input volume with iC input maps has max pooling applied to it. The output of the max pooling layer then undergoes a 1×1 convolution. This results in four separate output volumes which are then appended to produce the final output of the inception module.

The residual modules have two forward paths. The first path is similar to a conventional layer. The input volume can have a large number of input maps, with one implementation including up to 2048 input maps. A layer called 1×1 reduce uses this large volume as input and produces fewer output maps, such as up to 512 output maps. These are then convolved with a larger kernel, typically 3×3. A 1×1 expand is performed on the output of this layer. The expand operation does the inverse of reduce by using a smaller number of maps as inputs and produces a larger number of outputs. At this stage the second path of the residual modules is used. This second path contains the volume that was used as input to the first path (and, by extension, the residual module). The number of output maps produced as the output of the first path is equal to its inputs. The second path is then added using element-wise addition to the output of the first path to produce the output of the residual module.

Accelerator Architecture

Figure 1:
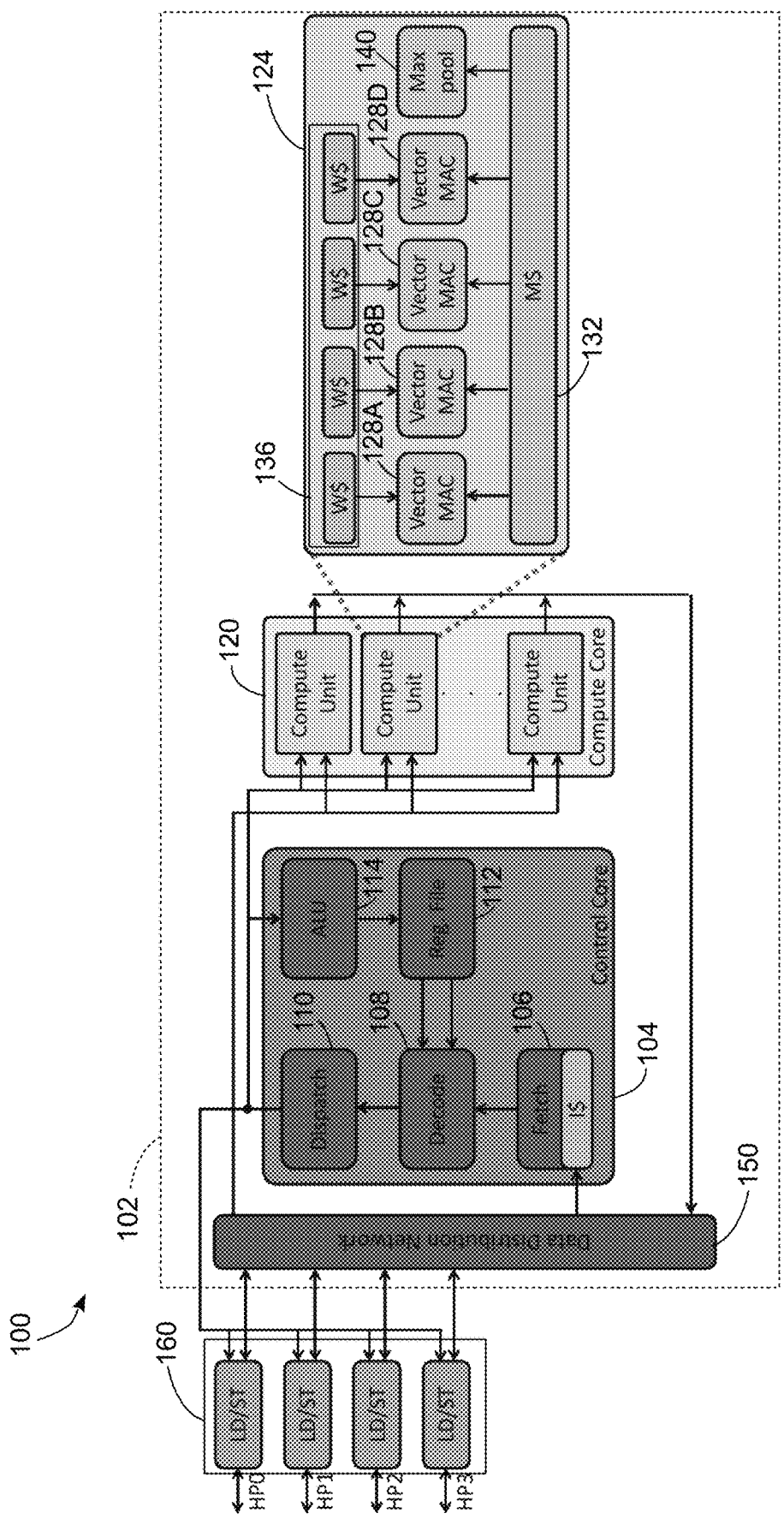
FIG. 1 is a schematic diagram of a hardware accelerator for convolutional neural networks.

FIG. 1 depicts an accelerator 100 that implements CNN processing using the hardware architecture described herein that executes software to process CNNs with improved computational efficiency. The accelerator 100 includes a single compute cluster 102 that further includes a control core 104, a compute core 120, and a data distribution network 150. As described in more detail below in FIG. 2, an accelerator can include multiple compute cores. In the embodiment of FIG. 1, the compute cluster 102 is connected to a memory interface 160 that provides memory I/O to an external memory device. In the embodiment of FIG. 1, the compute cluster 102 and memory interface 160 are implemented as a single integrated circuit that is formed on a monolithic semiconductor substrate (a single "chip" implementation). In one embodiment the accelerator 100 is implemented using field programmable gate array (FPGA) digital logic hardware, although in other embodiments the accelerator 100 is implemented as an application-specific integrated circuit (ASIC). Furthermore, some portions of the accelerator 100 such as the control core 104 that is described in further detail below may be implemented using a central processing unit (CPU) implementation such as an ARM, RISC, or other suitable CPU core.

In the accelerator 100, the control core 104 is designed as a simple RISC-style, five stage pipeline. The control core 104 contains fetch unit 106 that includes a 4 kB direct mapped instruction cache, an instruction decoder 108, a dispatch unit 110, a two-ported register file 112 and an arithmetic logic unit (ALU) 114 containing a multiplier, an adder and a comparator.

The fetch unit 106 loads program instructions and other data received from an external memory device via the memory controller 160 and the data distribution network 150. The instruction fetch stage of the fetch unit 106 contains the instruction cache and a program counter (PC) register. The design of the accelerator 100 reduces the effects of latency during the CNN processing operation, which in turn enables instruction cache to be comparatively small (4 kB) since the accelerator 100 does not need to employ techniques such as loop unrolling to keep instructions available for execution. In one configuration, the longest branch in the loaded instructions is always to an instruction within 512 instructions from the branch instruction. In the embodiment of FIG. 1, the control core 104 is a 32-bit processor core that requires a minimum instruction cache size of 2 kB with the embodiment of FIG. 1 using the double-buffered 4 kB instruction cache size to overlap the latency of fetching the next instruction stream while maintaining a copy of the existing instruction stream in the cache.

In the control core 104, the instruction decode stage is split into a separate instruction decoder 108 and a dispatch unit 110. The dispatch unit 110 is also responsible for preventing read access to a buffer that is also the destination for a load instruction. The instruction decoder 108 stage also performs a check for true data dependencies and stalls the fetch of further instructions until the dependent instruction commits. The dispatch unit 110 reads the source operands from the register file 112, which is a dual-ported 32-entry register file where each entry is 32 bits in the embodiment of FIG. 1. The dispatch unit 110 also includes hardware that tracks the number of loads issued to the on-chip buffers in the maps cache 132, weights cache 136, and decoded instruction cache of the compute core 120. This is necessary in order to prevent a vector instruction from reading data from these buffers while a load is pending, thus preventing read-after-write hazards through these buffers. This prevents the vMACs 128A-128D and the vMAX 140 in the compute units 124 of the compute core 120 from accessing a buffer before data from memory has completed writing to it. The control core is responsible for loading the map trace data, kernel trace data, and the compute instructions to caches in the compute core 120. These compute instructions are in the form of traces described above. Each trace instruction contains the trace length, the mode of computation (independent or cooperative) and the addresses of the maps and weights caches where the first pixel in the trace resides. Other instructions are loads, stores, ALU operations that increment the trace start addresses and branches. Branch instructions are followed by four branch delay slots. Most loops can make full use of these slots. The latencies associated with non-trace instructions can usually be hidden because a single trace instruction keeps the vMACs occupied for several cycles.

In the control core 104, the ALU 114 supports a subset of operations available in most standard ALUs. In the embodiment of FIG. 1, the ALU 114 contains a multiplier, an adder and a comparator. In the accelerator 100, the ALU 114 is not directly involved in processing a CNN layer. Instead, the ALU 114 specifically and the control core 104 generally perform operations to support bookkeeping operations necessary for issuing vector instructions to the compute core 120, which is where CNN processing occurs. For example, the adder in the ALU is utilized to increment the address of buffers in the compute core 120 from where the next trace is to be read.

The data distribution network (DDN) 150 is responsible for forwarding data returned from memory to the correct on-chip buffers and forwarding results produced by the coprocessor back to memory. In the embodiment of FIG. 1 the bus from memory contains 64-bit words while in one embodiment of the accelerator 100 the vectors that form each trace are 256 bits wide, although different embodiments can use different memory bus widths. As a result, the DDN packs four memory words into a single vector. When receiving data from memory that is destined for the instruction cache, the DDN unpacks a 64-bit memory word into two 32-bit instructions.

The memory interface 160 connects the accelerator 100 to one or more external memory devices, which are typically high-speed random access memory (RAM) devices such as double data rate (DDR), graphics double-data rate (GDDR), high-bandwidth memory (HBM), hybrid memory cube (HMC), and any other suitable high-speed RAM device. The memory interface contains four load-store units. Each unit is capable of sustaining 1 GB/s of bandwidth in full-duplex, although other embodiments may provide different memory bandwidth levels. The load units supply data to the DDN. Each memory word is accompanied by its physical memory address, the buffer address at which the word to be written and a destination identifier (ID). The destination ID is used by the DDN 150 to forward data to the correct buffer, such as the instruction cache in the fetch unit 106 of the control core 104 or a particular maps cache or weights cache within the compute core 120 that is described in greater detail below. The memory address is necessary to write to the instruction cache. Finally, a single bit last signal is included which signals the dispatch unit 110 of the control core to unlock read access the corresponding buffer so that any trace instructions that are being held back can proceed.

Figure 2:
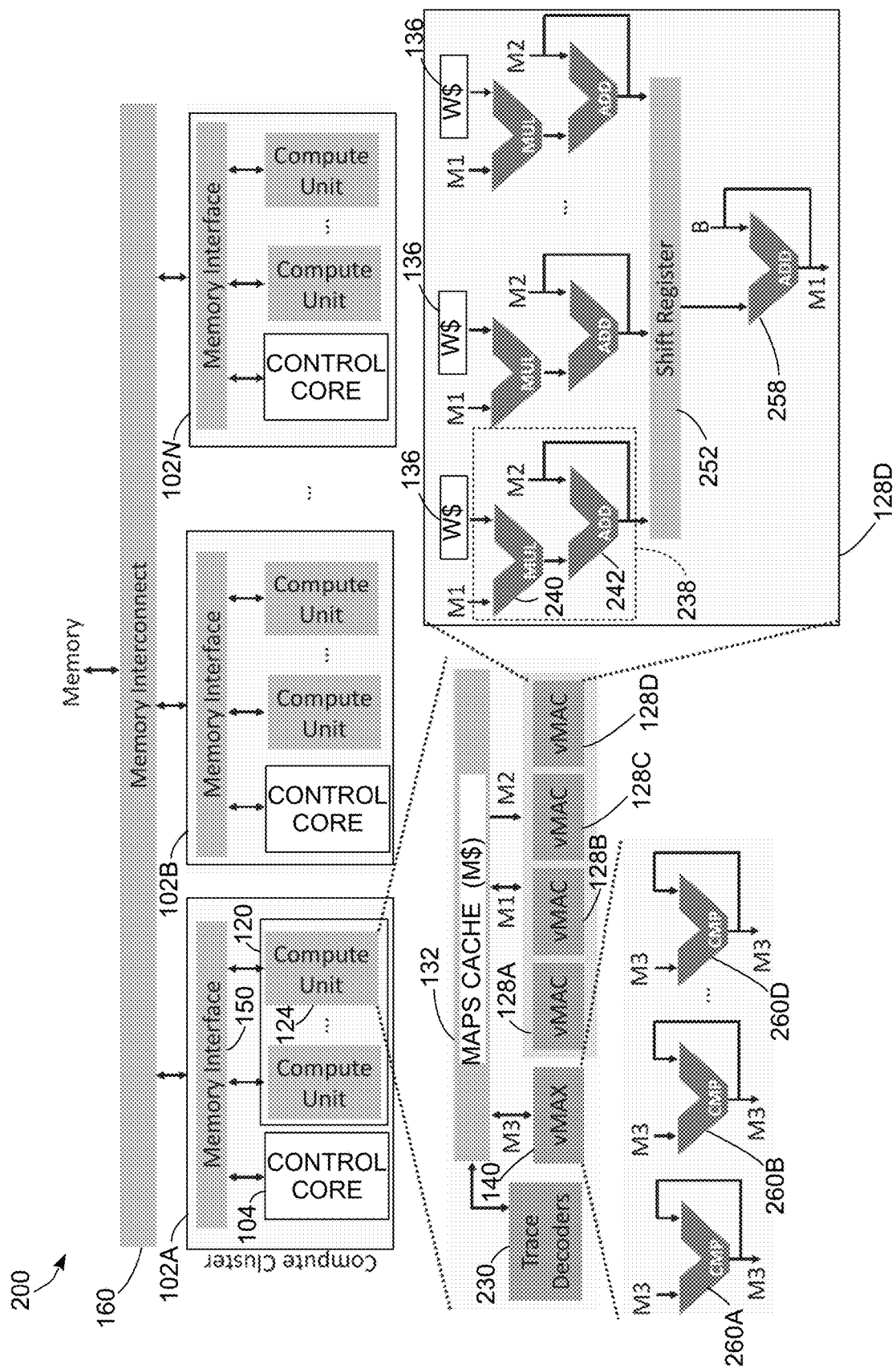
FIG. 2 is a schematic diagram of a hardware accelerator for convolutional neural networks that includes multiple compute clusters.

The accelerator 100 of FIG. 1 implements a single compute cluster 102. The accelerator FIG. 2 depicts another configuration of a hardware accelerator 200 that includes a plurality of the compute clusters 102A-102N that each share the same configuration as the compute cluster 102 of the accelerator 100 including a control core 104, a compute core 120 with a plurality of compute units 124, and a data distribution network 150. In the accelerator 200, the compute clusters 102A-102N are connected to a single memory controller 160 for communication with the external memory device. The accelerator embodiments described herein can employ different numbers of compute clusters to provide CNN accelerators to meet a wide range of performance, hardware complexity, and power consumption levels. Unless otherwise noted, references to the structure and operation of the accelerator 100 are equally applicable to the accelerator 200 and vice versa.

In the accelerators 100 and 200, each compute core 120 implements the processing of the CNNs including processing of traces of input map data and traces of the weight values for the kernels that are used in different layers of the CNN. Referring to FIG. 1 and FIG. 2, each compute core 120 further includes a plurality of compute units. FIG. 1 and FIG. 2 depict a single one of the compute units 124 in additional detail for illustrative purposes. The compute unit 124 includes a plurality of vector multiply-accumulate units (vMACs) 128A-128D with the illustrative embodiment of FIG. 1 including four vMACs in the compute unit 124. Each vMAC, in turn, includes a plurality of multiply-accumulate units (MACs), with the embodiments described herein including 16 MACs in each vMAC for a total of 64 MACs in a single compute unit. The compute unit 124 also includes a maps cache (M$) 132 and weights cache (W$) 136. The maps cache 132 stores map trace data (also referred to as "maps") corresponding to a contiguous set of map data in a contiguous regions of memory in the original input to the CNN or intermediate input data received from another layer of the CNN. The weights cache 136 stores weight data in kernel traces corresponding to contiguous sets of weight data in contiguous regions of memory corresponding to portions of a kernel in a convolutional layer of the CNN or a fully-connected layer in the CNN that the accelerators 100 and 200 apply to the map traces in the maps cache 132. In the compute unit 124, each of the vMACs 128A-128D has read/write access to one or more map traces in the entire maps cache 132 while each vMAC reads a trace of the weights in the weights cache 136. In each compute unit 124, the maps cache 132 stores at least a portion of a map trace for a single pixel and the weights cache 136 stores at least a portion of the weights in the kernel trace for the single pixel, although in some configurations the maps cache 132 and the weights cache 136 can store the full trace for a single pixel or traces for multiple pixels. The maps cache 132 and the weights cache 136 are implemented using one or more static random access memory (SRAM) buffers that are integrated into the compute unit 124. The compute unit 124 also includes a trace decoder 230 (FIG. 2) and a single vector maxpool unit (vMAX) 140 that reads data from the maps cache 132, which can include output data generated by the vMACs 128A-128D. The vMAX 140 generates a single output corresponding to the maximum value of a set of data that are read from the maps cache 132. In some operations, the vMAX reads the outputs of the vMACs 128A-128D from the maps cache 132. As is described in more detail below, the vMACs 128A-128D in each compute unit implement part of a convolutional layer in a CNN and the vMAX unit 140 implements part of a maxpool layer, if one is used, that is applied to the output of the vMACs 128A-128D.

Figure 5:
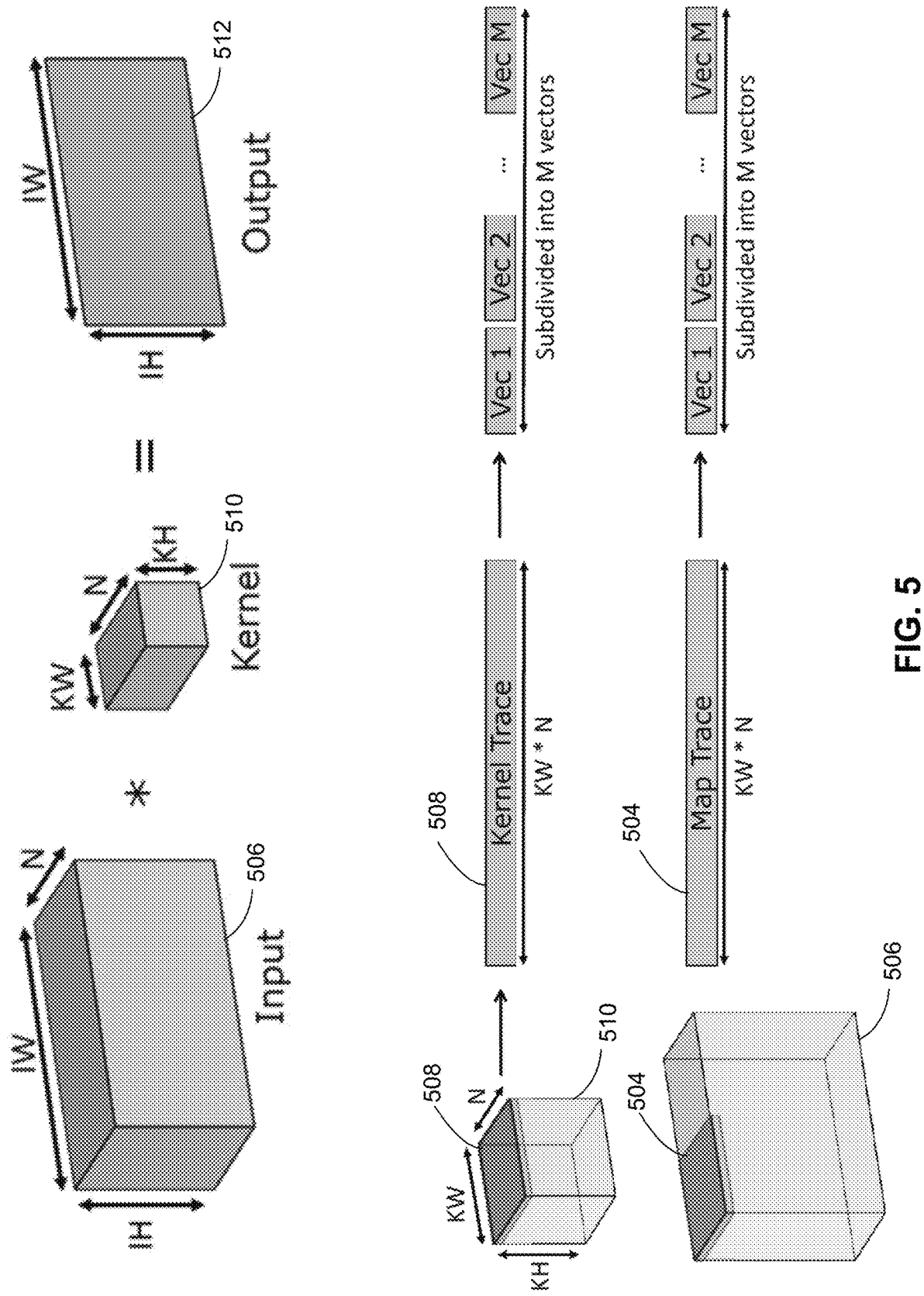
FIG. 5 is a diagram depicting the kernel trace and map trace data that are stored in caches of the accelerators of FIG. 1 and FIG. 2 in more detail.

As used herein, the term "trace" refers to a contiguous region of memory that the accelerator embodiments described herein access as part of the computation necessary to produce a single output pixel from a convolutional layer of a CNN. FIG. 5 depicts an example of a map trace 504 and a kernel trace 508. The map trace 504 refers to a contiguous region of memory that includes input data (an "input map") that is supplied as input to the layer of the CNN from a three-dimensional set of input maps. FIG. 5 depicts the full three-dimensional set of input maps 506 including a set of N input maps in which each input map is a two-dimensional set of data with width IW and height IH. The kernel trace 508 refers to a contiguous region of memory that contains weights used by the CNN layer. In FIG. 5, the kernel trace 508 is selected from a portion of a larger three-dimensional convolutional kernel 510 that includes a width (KW), height (KH), and depth (N). The set of input maps 506 and the three-dimensional convolutional kernel 510 both have the same depth N but the convolutional kernel 510 has a smaller width and height (KW≤IW and KH≤IH). The accelerators 100 and 200 apply the three-dimensional kernel 510 to the three-dimensional input 506 to generate a two-dimensional output 512, where each element of the output 512 is also referred to as a "pixel". The input data can be from an input image that is supplied to the CNN or the input data can be an intermediate output from a previous layer of the CNN that acts as the input to a subsequent layer. Usually, an output pixel requires multiple traces to be processed and accumulated. In the illustrative configuration of the accelerators 100 and 200, the compute units 124 in each compute core 120 typically store map traces, such as the map trace 504, in the maps cache 132 and kernel traces, such as the kernel trace 508, in the weights cache 136. However, the maps cache 132 and the weights cache 136 are implemented as SRAM buffers that can store different types of data and the accelerator 100 is not exclusively limited to storing map trace data in the maps cache 132 or kernel trace data in the weights cache 136, and in some instances the maps cache 132 may store weights in a kernel trace and the weights cache 136 may store map data from a map trace.

The length of a trace depends on the size of the kernel and the number of input channels in that layer. For example, a layer with 256 input maps and 3×3 kernels would require 3 traces, each of length 256×3=768, to produce one output pixel. Splitting computation into traces enables the accelerator to avoid latency penalties that are associated with branches, loads, stores and other non-compute instructions. This is because computation of a trace requires a single instruction that usually takes several cycles to process. Map trace data or kernel trace data that are part of a trace are accessed from on-chip buffers at 256-bit granularity in the embodiment of FIG. 1, although alternative embodiments access data with larger or smaller granularity. These smaller blocks of data are called vectors. One embodiment of the accelerator 100 uses 16-bit fixed point words as individual values in the vectors, where "fixed point" here refers to operands that are treated as integers instead of "floating point" decimal operands. As a result, each vector contains 16 words (16 bits per word×16 words=256 bits in each vector). The choice for 16-bit fixed-point words was made because for CNNs there is insignificant loss in accuracy between networks using 16-bit fixed point and 32-bit floating point values, although other embodiments can use a word-length that is greater than 16 bits (e.g. 32 bits, 64 bits) or less than 16 bits (e.g. 8 bits), and may use floating-point word operands instead of fixed-point word operands.

In more detail, the accelerator embodiments described herein use traces to hide latencies of non-compute instructions behind compute cycles. By hiding the latencies of branches, true dependencies and memory loads and stores, the accelerator achieves improved computational efficiency. Due to the nature of a layer's inputs, there are three dimensions along which the accelerator iterates first to produce an output value. Two of the three dimensions, the width and height of the kernel, are usually identical and only vary in whether data is accessed row-major or column-major. These dimensions are also usually the shorter of the three. For example, the largest kernel size is found in AlexNet's layer 1 and is 11×11. By comparison, the third dimension, the depth of the input volume, can be as large as 2048. In fact, apart from the first layer, whose depth is 3, other layers have a depth of 32 or more. Data organized in this depth-first format results in the longest trace. Using one configuration of the diagram 950 from FIG. 9 in which iC=256 and kW=kH=3, the trace length for this layer will 256×3=768. To produce one output element, kH=3 such traces will be required. In the event that a single functional unit processes this trace, it will take 768 cycles to complete one trace. If a single instruction can keep this functional unit busy for 768 cycles, the instruction pipeline can proceed with other instructions necessary to prepare the second trace instruction while the functional unit is processing the first trace. The concept of traces can be extended to other compute instructions like max pool and non-compute instructions like loads and stores. This is the primary latency hiding technique used by the accelerator embodiments described herein. The instructions that operate on traces are called vector instructions. The longest and shortest trace lengths for some popular CNN models are shown in the following table:

| Model | Naïve Implementation | | Depth-first | |
| --- | --- | --- | --- | --- |
| | Longest trace | Shortest Trace | Longest Trace | Shortest Trace |
| AlexNet | 11 | 3 | 1152 | 33 |
| VGG-D | 3 | 3 | 1536 | 9 |
| GoogLeNet | 7 | 1 | 1024 | 21 |
| ResNet-50 | 7 | 1 | 2048 | 21 |

Referring again to FIG. 1 and FIG. 2, in the compute unit 124, the trace decoders 230 receive vector instructions from the control core 104. The vector instructions are pushed into a FIFO queue and are issued when their trace decoder is ready to receive an instruction. These instructions have the start address of the trace in the maps cache 132, the length of the trace and the ID of the consumer. Based on the consumer ID, the instruction is forwarded to the appropriate trace decoder. The decoders increment the start address and request a line from the maps cache 132, once per cycle, until the length of the trace is reached. At this point, the next trace instruction is fetched and the process continues. The control core 104 is responsible for having the next vector instruction available before the compute unit 124 completes the current vector instruction to ensure that the compute unit 124 does not have to wait for additional vector instructions during operation.

While not depicted individually in FIG. 2, the trace decoders 230 include a MAC trace decoder, a MAX trace decoder, and a trace move decoder, and a VMOV decoder. The MAC trace decoder fetches cache lines from the maps cache 132 and forwards them to the vMACs 128A-128D. It also provides addresses to index into the weights cache that is accessed by each vMAC. This decoder is also responsible for signaling the vMACs to output the result accumulated in their internal accumulate registers. This signal is sent along with the last address of the final trace of the computation. The MAX trace decoder fetches cache lines from the maps cache and forwards them to the vMAX unit 140. Similar to the MAC trace decoder, it signals the vMAX unit 140 to output the compared result after the final comparison. The trace move decoder is responsible for moving a trace from the maps cache of one compute unit to the maps cache of another compute unit (compute unit trace move) or storing a trace to memory (memory trace move). In case of a compute unit trace move, the destination compute unit has to be within the same cluster as the source compute unit. The logic implementing these two functions shares access to the maps cache. If both types of trace move instructions are issued, the decoder will alternate between the two functions every cycle. In the embodiment of FIG. 2, the VMOV decoder reads 256-bit vectors from the maps cache 132 and writes the vector as 16-bit word inputs to each of the sixteen adder units 242 in a the MACs that form a vMAC.

The trace decoders 230 continue processing their vector instructions, allowing the control core to proceed with scalar instructions that prepare the next set of vector instructions. Strictly speaking, the trace decoders enable the accelerators 100 and 200 to execute and commit vector instructions out of order with respect to scalar instructions. Correctness is maintained because of the guarantee that a scalar instruction never reads data produced by a vector instruction. This allows the control core to have a much simpler design than pipelines with speculative execution because the control core 104 can execute and commit scalar or vector instructions in-order with respect to other scalar or vector instructions.

Each of the vMACs 128A-128D includes a plurality of multiplier units that multiplies two numbers together and a plurality of adder units that add the output of the multiplier unit to another input number. This combination of a multiplier unit and an adder unit is also referred to as a multiply-accumulate unit (MAC). By way of example, the vMAC 128D in FIG. 2 includes a plurality of MACs including a MAC 238 with a multiplier unit 240 that multiplies input data M1 that is part of a trace stored in the maps cache 132 and a weight value from the weight trace cache 136. The adder unit 242 adds the output of the multiplier unit 240 to another value M2 that is received from the maps cache 132 in one configuration. In this configuration, the adder unit 242 receives a 16-bit value from the maps cache 132 and performs sign-extension to produce a 32-bit input that has the same precision as the intermediate product from the multiplier unit 240. In another configuration, the value M2 is the previous output of the adder unit 242 in an accumulation operation. In the example of the accelerators 100 and 200, each of the inputs M1 and the weight input value is a 16-bit numeric value, and the multiplier unit 240 produces a 32-bit output for the product of the 16-bit inputs to avoid loss of precision. The vMAC 128D includes 16 MACs with the same configuration as the MAC 238 to process an input data trace and corresponding weight trace that both include 256 bits of data.

In more detail, the multiplier unit 240 in the MAC 238 and the other MACs multiplies two 16-bit word operands and produces a 32-bit result, which is referred to as an "intermediate product" because it is not the final output of the MAC 238. The intermediate product is a 32-bit word value. A first operand is a first 16-bit word corresponding to a portion of a vector of map trace data stored in the map trace cache 132 and a second operand is a second 16-bit word corresponding to a vector of kernel trace data stored in the weights cache 136. The output of the multiplier unit 240 is connected to one of the inputs of the adder unit 242. The second operand of the adder unit 242 (M2 in FIG. 2) is a third word (32 bit value) that is selected from either the adder unit 242's own output, or as a sign-extended version of a third 16-bit word that is stored in another vector in the maps cache 132. The value M2 can be a partially accumulated result or an activation output from a previous layer in the CNN, as is used in residual modules. The final output of the MAC 238 is the sum of the intermediate product from the multiplier unit 240 added to the third word M2 using the adder unit 242. The adder unit 242 is also a 32-bit adder that produces a final 16-bit output via a truncation process that selects 16 bits as the final output from the 32-bit adder result (e.g. the middle 16 bits in a Q8.8 format, bits 11-26 in a Q5.11 format, or any other suitable set of 16 bits). The final output of the adder unit 242 is a 16-bit fixed point numeric word value. The accelerator 100 uses 16-bit word operands because prior work has shown that 16-bit fixed-point resolution has negligible impact on detection accuracy as compared to floating point number.

Each of the vMACs 128A-128D also includes a shift register 252 and a gather adder 258. The shift register 252 is connected to outputs of the MACs in each vMAC, including the MAC 238 in FIG. 2. During operation, the shift register 252 generates a series of outputs, where each output in the series of outputs corresponds to an output of one of the MACs. One input of the gather adder 258 is connected to the output of the shift register 252. In the cooperative operating mode that is described in more detail below, the shift register 252 provides a series of outputs of the MAC adders, one output per cycle of operation. For example, the shift register 252 provides the output of the adder unit 242 in the MAC 238 to one input of the gather adder 258 in one cycle. The gather adder 258 generates a sum of all the outputs of the MACs in the vMAC in an accumulation operation over a series of cycles where the second input to the gather adder 258 is the partial sum of all previously added MAC outputs. The gather adder 258 adds a single bias term B that is stored in the weights cache 136 as part of the total sum of all the MACs for at least one vector of map input data in the cooperative mode to produce a single output value M1 for a set of outputs from all of the MACs in a single vMAC. By contrast, in the independent operation mode that that is described in more detail below, the gather adder 258 receives the output of a single MAC from the shift register 252 during each cycle of operation and adds the bias term B to generate a single output. In the independent operating mode, the gather adder 258 generates 16 individual outputs, one output per MAC, for at least one vector of map input data to the vMAC instead of the single output value of the cooperative mode. In both operating modes, the bias term provides a bias value that is known to the art for use in the convolution layers of convolutional neural networks.

As described above, the accelerators 100 and 200 apply a non-linear function to the outputs of some layers in a CNN. To apply the ReLU non-linear function, the accelerators 100 and 200 each process the most significant bit of the final outputs from the gather adder 258 to determine the sign of the final output value. If the sign is negative (typically a "1" in the most significant bit) then the output of the gather adder 258 is replaced with a 0 value output that is then stored in the maps cache 132 or transferred to external memory. If the sign is positive (a "0" in the most significant bit) then the output of the gather adder 258 remains unchanged and is stored in the maps cache 132 or transferred to external memory. A non-limiting example of a hardware configuration that implements ReLU is a multiplexer circuit that uses the most significant bit from the gather adder 258 output as a select line and that emits either 0 or the original output of the gather adder 258. Other embodiments of the accelerators 100 and 200 can include additional hardware processing elements that apply other non-linear functions such as the sigmoid or hyperbolic tangent functions to the outputs of the gather adder 258.

As depicted in FIG. 1 and FIG. 2, each of the compute units includes a vector maxpool (vMAX) unit 140 that processes convolutional layers in a CNN. As depicted in FIG. 2, one embodiment of the vMAX unit 140 includes four comparators (one is omitted from FIG. 2) 260A-260D that processes 16 words of input data at a time to generate an output corresponding to the maximum output (M3) of any of the individual MACs in one of the vMACs 128A-128D in the compute unit 124. Each of the comparators 260A-260D is a 16-bit comparator that receives four words (two 16-bit values) and requires 4 cycles to process the words. For a 3×3 maxpool window, the vMAX 140 receives nine vectors, one vector at a time, in which each vector including 16 words (256-bits per vector). The vMAX 140 identifies the maximum values that are compared across vectors. In the 3×3 configuration, the 9 input vectors are maxpooled into a single 16 word vector that includes the maximum element from the corresponding entries of the 9 input vectors. In the embodiment of FIG. 1 and FIG. 2 that includes four comparators in the vMAX 140, a 3×3 maxpool window requires 3*3*4=36 cycles to complete and produces 16 words.

Since the vMACs can write data back to the maps cache 132, the processing of a maxpool layer proceeds without requiring access to main memory. The control core can issue vector instructions to the vMACs and vMAX functional units simultaneously, which enables the accelerators 100 and 200 to hide the maxpool processing latency behind the MAC operations. The results from the vMAX units are stored back to the maps cache 132.

As described above, the maps cache 132 and the weights cache 136 store at least a portion of traces of input data and kernel weight data, respectively, that the vMACs 128A-128D use as inputs to implement a convolutional layer or a fully-connected layer of the CNN. Furthermore, the vMAX unit 140 uses the outputs of the vMACs 128A-128D that are stored in the maps cache 132 as inputs for a maxpool layer of the CNN. One practical embodiment, two scratchpad memory cache devices that are operatively connected to the vMACs implement the maps cache 132 (a first scratchpad memory device) and the weights cache 136 (a second scratchpad memory device). In an alternative embodiment a single scratchpad memory device may include separate memory regions that store the map trace data for the maps cache 132 and the kernel trace data for the weights cache 136. The scratchpad memory is integrated into the same chip as the compute core 120 and provides high-bandwidth and low-latency memory access to components in each of the compute cores 120 including the vMACs 128A-128D, vMAX 140, and the trace decoders 230. There are as many weights caches as MACs within the design where each weights cache stores weight elements from a kernel trace for a convolutional layer or a fully-connected layer in the CNN. Each MAC has a weights cache connected to one of its inputs, as shown in FIG. 1 and FIG. 2.

Depending on the mode of computation, one or all of the weights caches within a vMAC also provide the bias operand. In cooperative mode, only one bias operand is necessary as all MACs produce partial results of the same output. In independent mode, all weights caches provide the bias operand. The bias value remains constant throughout the entire output map. When a new output map is being computed, the bias is loaded once at the beginning into a register connected to the second operand of the gather adder 258. The MAC trace decoder provides the weights cache with the address at which the weights operand is located.

Figure 3:
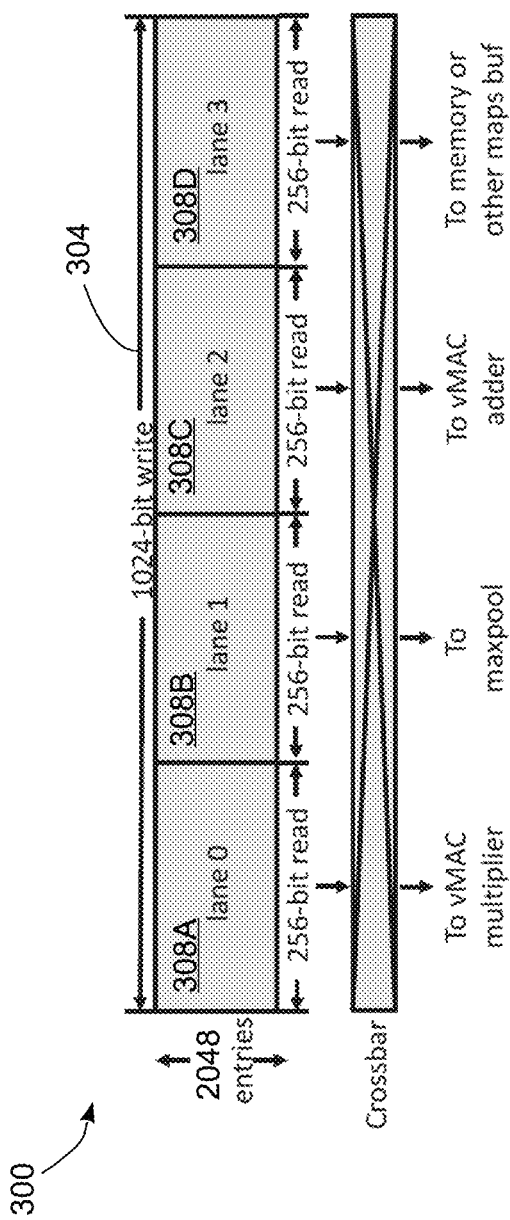
FIG. 3 is a schematic diagram of an embodiment of a maps cache in the accelerators of FIG. 1 and FIG. 2.

FIG. 3 depicts an illustrative embodiment 300 of the scratchpad memory that implements the maps cache 132. The scratchpad memory is accessed by a set of four vMACs, such as vMACs 128A-128D in FIG. 1, the vector maxpool unit 140, the control core 104, the external memory interface, and other sets of scratchpad memory in the compute core 120 that access individual map traces and kernel traces. The scratchpad memory 300 is arranged in lines ("cache lines") of 1024 bits. The scratchpad memory 300 has a 1024-bit write port 304 and four banks 308A-308D, each with 256-bit read ports, which are called lanes. In the embodiment of FIG. 3, there are a total of 2048 entries of the 1024-bit lines in the scratchpad memory for a total of 256 kB of cache space, although other memory configurations can be larger or smaller than the embodiment of FIG. 3. Each 1024-bit cache line entry in the scratchpad memory 300 stores vectors of map trace data. The four vMACs 128A-128D consume a 256-bit vector of map trace data in one cycle if they are operating in cooperative mode from one output of the crossbar depicted in FIG. 3. The vMACs 128A-128D require up to 16 cycles to consume a cache line if operating in independent mode since all of the MACs in a single vMAC read from the same 16-bit word in a single vector of trace data of one of the banks 308A-308D in the independent mode. Data are written to the maps cache 132 from an external memory, the vMACs 128A-128D, the vector maxpool unit 140, or from the maps cache in another compute unit. The maximum bit width is 1024 but there are enable signals at a 64-bit granularity. This is to allow data from the vMACs, which for cooperative mode is 64 bits, to be written back.

The trace decoders 230 can access the scratchpad memory every cycle. The fourth port is used to access a third operand and can be used to access the bypassed connections in residual modules or for previously computed partial results. The MAC trace decoder gets priority to read from the maps cache 132. Its read request to any lane is always granted. The read for the other decoders is granted only if they do not access the same lane as the MAC decoder. The trace move decoder's access is shared by its memory-move and compute unit move (CU-move) functions. If both memory and CU-move instructions are issued, they alternate accesses to the maps cache 132. The read request from the decoders is given to the source lane. The lane is identified by using the lower two bits of the read address. Cache lines read from the lanes are directed towards their requestors.

Figure 4:
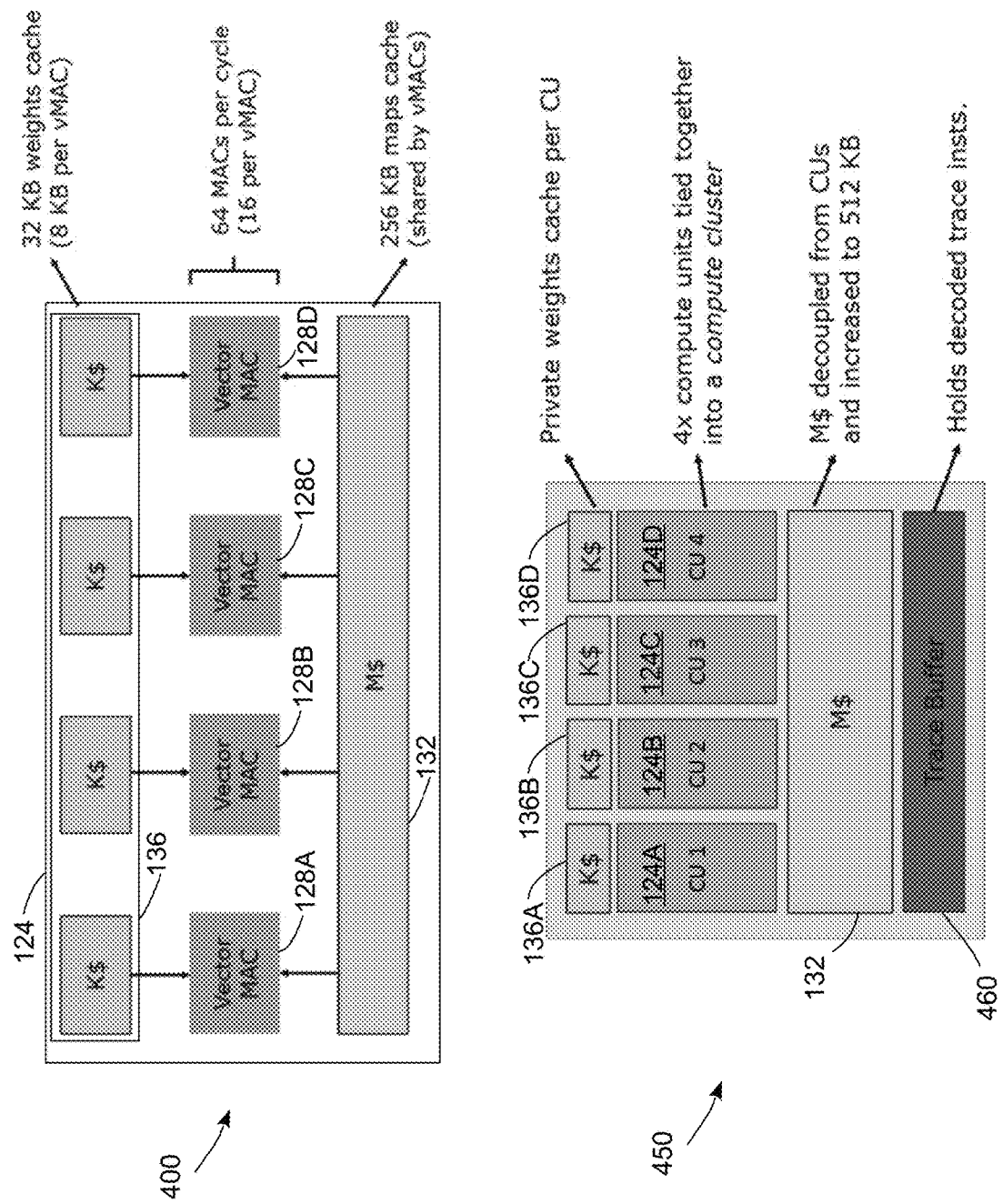
FIG. 4 is a schematic diagram of an embodiment of an arrangement of the compute units in the accelerators of FIG. 1 and FIG. 2.

FIG. 4 depicts two illustrative embodiments of the weights cache that stores kernel traces and maps cache that stores input data traces in the compute cores 120 of the accelerators 100 and 200. In the embodiment 400, the maps cache 132 and the weights cache 136 are integrated into a single compute unit 124 and each compute unit 124 includes an individual maps cache 132 and weights cache 136, which may be implemented using two different scratchpad memory devices in each compute unit as described above. As depicted in FIG. 4, in one configuration the weights cache 136 is a 32 kB memory buffer (8 kB per vMAC) and the maps cache 132 is a 256 kB memory buffer. The embodiment 450 depicts a compute core with four compute units 124A-124D that are each connected to a separate weights cache, with the compute units 124A-124D being connected to the weights caches 136A-136D, respectively. The compute units 124A-124D are all connected to a single maps cache 132, however. In the embodiment 450 the maps cache 132 is a 512 kB memory buffer. The embodiment 450 also includes a trace buffer 460 that stores decoded instructions.

Cooperative and Independent Operating Modes

Figures 6A, 6B:
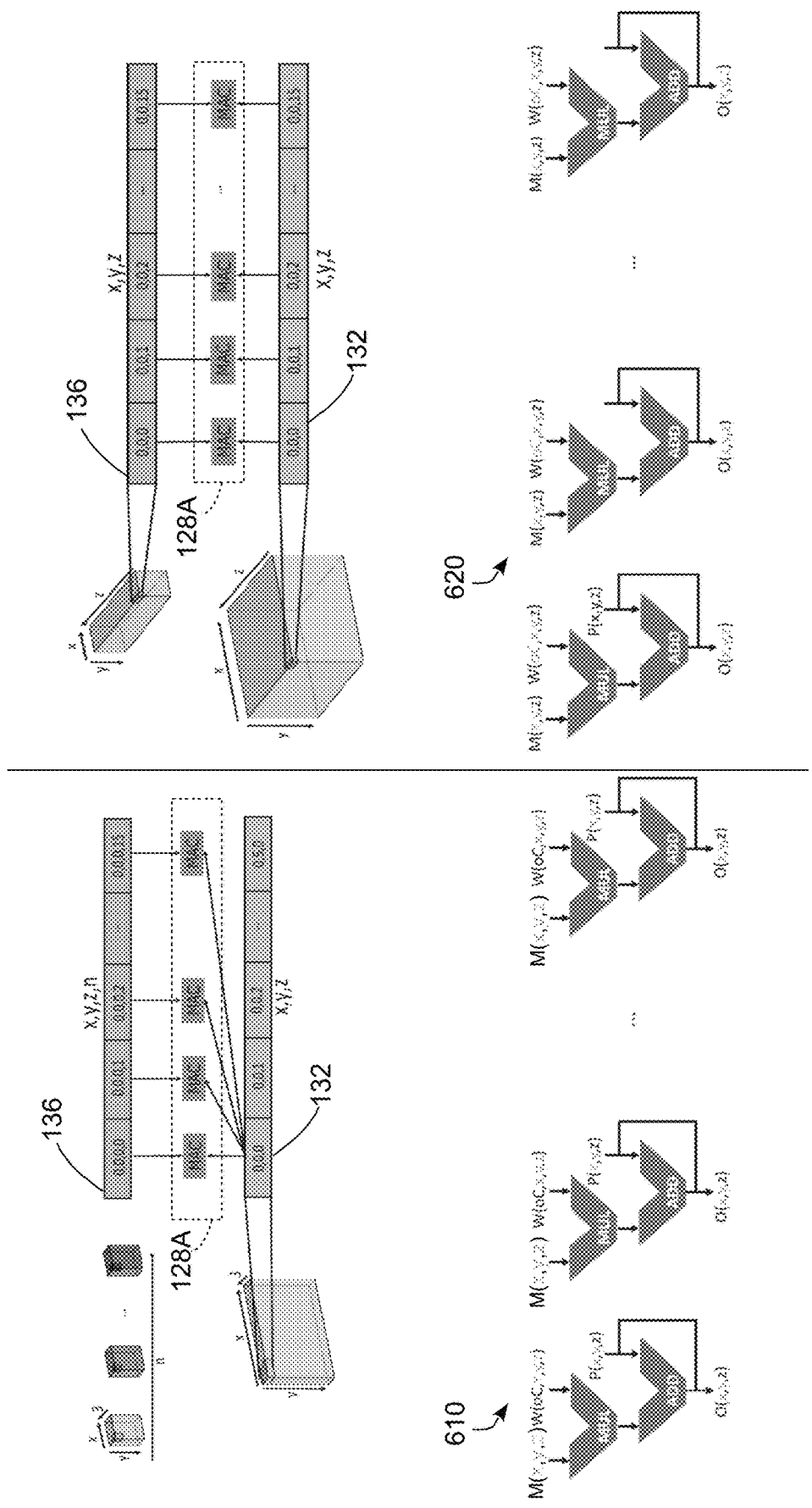
FIG. 6A is a diagram depicting operation of the accelerators of FIG. 1 and FIG. 2 in an independent mode.
FIG. 6B is a diagram depicting operation of the accelerators of FIG. 1 and FIG. 2 in a cooperative mode.

The accelerators 100 and 200 can operate in different modes that utilize different forms of parallelism to process CNNs with complex structures more efficiently. FIG. 6A and FIG. 6B shows two of the types of parallelism that can be exploited in accelerators 100 and 200 when operating in an "independent" mode (FIG. 6A) and in a "cooperative" mode (FIG. 6B). In FIG. 6A and FIG. 6B, the coordinates that vary across the MACs in a vMAC are shown in black while the coordinates that remain constant are shown in gray. In each compute cluster, the control core 104 selects the operating mode for the compute units 124 in the compute core 120 for each layer of a CNN by generating specific instructions for the vMACs that adjust how each vMAC loads and processes input data as is described in further detail below. As described above, the vMAC embodiments in the accelerators 100 and 200 include 16 individual MACs. In FIG. 2, M is a maps operand corresponding to an input map data trace in the maps cache 132 and W is a weights operand corresponding to a kernel trace in the weights cache 136. The (x, y, z) coordinates are part of a standard CNN as shown in the diagram 900 of FIG. 9 while oC corresponds to an output channel.

One operating mode for the accelerators 100 and 200 is the cooperative mode. In the cooperative mode, the 16 words of a vector in a trace are split up among a group of 16 multiply-accumulate (MAC) units in each vMAC. This splits up the computation of a single output among several MACs because each MAC receives a different 16-bit word portion of the 256-bit vector of map trace data received from the maps cache 132, with the 16 MACs in each vMAC of the accelerators 100 and 200 each receiving a different 16-bit word. A separate gather adder 258 in each vMAC, performs reduction on the partial sums stored in the internal accumulate register of each MAC, to produce a single output pixel. Since multiple MACs work together to produce an output, this method of mapping is called the cooperative mode of computation.

The cooperative mode is illustrated in FIG. 6B using the vMAC 128A, maps cache 132 and weights cache 136 of FIG. 1 and FIG. 2 as examples. The benefits of the cooperative mode are twofold. First, the cooperative mode maximizes MAC utilization. In a 2D systolic grid, maximum utilization can only be achieved if the size of the grid is equal to or an integer multiple of the kernel size. In the accelerator, MAC utilization is 100% any time the number of input maps is an integer multiple of 16. This is usually the case for all but the first layer of a CNN. The second benefit of this type of mapping is that it reduces the size of the on-chip static RAM (SRAM) buffer that is required per MAC to implement the maps cache 132 and the weights cache 136. Each MAC requires maps and kernels to process a layer. Maps can be shared across MACs to some extent. In that case, however, they require different kernels. For large networks, the size of a single kernel can be large. For example, the size of a single kernel in AlexNet's layer 3 is 6.75 kB. This mapping can be split up across 16 MACs instead of one, resulting in lower amount of SRAM necessary per MAC.

FIG. 6B shows data examples of the individual MACs 620 receiving input when operating in cooperative mode, which exploits intra-output parallelism. Every MAC within the vMAC 128A receives an input from the maps volume that has the same row and column index but is from a different input map (coordinate z varies in the inputs to the multiplier units and P(x,y,z) vary in the inputs to the adder units). The coordinates of the outputs are shown in gray because they are not independent from each other. All outputs produced by the MACs in this mode are partial results belonging to the same final output. Since the MACs work together to produce a single output, this mode is called the cooperative mode (COOP) of computation. The partial results are accumulated together using a reduce operation that is performed by the separate gather adder 258. The partial results from the vMAC are latched into the shift register 252 which feeds one partial result per cycle to one input of the gather adder 258. The output from the gather adder 258 is truncated to 16 bits and written back to the maps cache 132. The address to write to is provided with the trace instruction. The cooperative mode adds certain restrictions on what type of layers can be processed at peak efficiency. The gather adder requires 16 cycles to reduce the partial results produced by the MACs. If the MACs take fewer than 16 cycles to process a result, they would still need to wait until 16 cycles have passed before producing the next set of partial products. This requirement implies that the sum of the lengths of all traces required to produce an output using cooperative mode should be 256. This restriction prevents layers that have 128 input maps and 1×1 convolution kernels from achieving peak efficiency using cooperative mode. Such layers however can be run using the independent mode at peak efficiency if there are at least 64 output maps. In either computation mode, the gather adder 258 is also used to add the bias (B) to the output.

Another operating mode of the accelerator is referred to as the "independent mode", which is depicted in FIG. 6A. The cooperative mode described above does not work for layers that contain input maps that are not a multiple of 16. For that scenario, the data organization changes slightly. Maps are still stored depth-first. However, the weights are stored in a kernel-first order. Consider the case of AlexNet layer 1 with 64 kernels, each of which is 3×11×11 (not a multiple of 16). These will be stored such that the first element in the weights array is the first pixel of the first red kernel's first row in an embodiment that processes a red-blue-green set of input maps.

The independent mode is illustrated in FIG. 6A where each of the MACs in a vMAC (vMAC 128A for illustrative purposes) receives a single 16-bit word from a single portion of a 256-bit vector of map trace data stored in the maps cache 132. Each MAC uses weight data taken from a different layer of the kernel from a kernel trace stored in the weights cache 136, which is depicted as the four-dimensional coordinates for weight data seen in FIG. 6A compared to the tree-dimensional coordinates for weights from a kernel trace that only occupies one layer in the cooperative mode of FIG. 6B. The four-dimensional coordinates in the independent mode of FIG. 6A are used because each MAC within a vMAC uses a different input kernel in the independent mode, and each kernel is itself a three-dimensional structure (one coordinate to select the kernel and three coordinates that select weights within the kernel). In the cooperative mode of FIG. 6B, the three-dimensional coordinates address weights within a single three-dimensional kernel. In the independent mode of FIG. 6A, the MACs iterate over additional 16-bit word portions of the map trace until completing processing of the 256-bit vector of map trace data. The second element will be the first pixel of the second red kernel's first row. Similarly, the sixteenth pixel will be the first pixel of the sixteenth red kernel's first row. The seventeenth pixel will hold the first pixel of the first green kernel's first row. In this type of mapping, each MAC produces an output pixel. Since each MAC works independently of others, this type of mapping is called the independent mode of computation. The cooperative mode is used any time the number of input maps is a multiple of 16 while the independent mode is used for all other cases. This enables the hardware accelerator embodiments described herein to process CNN layers that include different sizes in an efficient manner to handle a wide range of CNN configurations.

The independent operating mode of FIG. 6A exploits inter-output parallelism, where the output O across the MACs has the same row and column location in the output volume but each MAC produces a different output map. As depicted in the MACs 610 of FIG. 6A, in the independent mode, each MAC receives the same input map data operand (coordinates x,y,z do not vary). The cache line containing the operand is fetched from the maps cache based on the address provided by the MAC trace decoder. The operand is selected using the word address. Theoretically, one word from a cache line of 16 can be selected by means of a multiplexer in a single cycle. However, to reduce hardware complexity, each vMAC includes another shift register. The other shift register shifts the cache line every cycle until the requested word is at the front of the register. It is then broadcast to all MACs. If the layer is irregular, this can result in a drop in computational efficiency. For example, if the fifth word in a cache line is requested, there will be four cycles of latency before the MACs are supplied with the operand they need to continue processing the layer. However, due to the spatial locality inherent in the input maps volume, there is a high probability that the sixth word in the same line is the next one requested. This would be available the following cycle, and from then on until the next trace, there would be no latency. This type of irregularity is only encountered in layers with input maps that are not a multiple of 16. Another inefficiency while using the independent mode can result because of the fact that in independent mode every MAC within the compute unit produces a different output map and there are 64 MACs in a compute unit, such as the compute unit 124. Due to this fact, the independent mode requires that for achieving peak efficiency, there be a multiple of 64 output maps in the layer being processed. If there are fewer output maps, some MACs would need to be turned off resulting in a drop in efficiency.

As described above, the embodiments of the accelerators 100 and 200 include 16 MACs per vMAC. The inclusion of 16 MACs in each vMAC is based on restrictions imposed by the gather adder 258 and the common characteristics of CNN layers. The gather adder 258 requires as many cycles as MACs in a vMAC to add bias to the outputs of the MAC (in independent mode) or reduce the outputs of the MACs (cooperative mode). Secondly, having the number of MACs equal to a power of two is necessary to optimally map the input maps to the MACs because the number of input maps is usually a power of two. Increasing the number of MACs in a vMAC to, for example, 32 MACs would result in the MACs in cooperative mode processing the input traces twice as fast, while doubling the number of partial results the gather adder has to reduce. Inception and bottleneck modules frequently have 1×1 convolutions with 256 or 512 input maps, which would require the independent mode if the number of MACs within a vMAC was 32 or higher. With independent mode, however, there is the restriction that the number of output maps has to be greater than the number of MACs within a compute unit, which is not the case for these Inception and bottleneck modules. This would result in decreased efficiency.

On the other hand, decreasing the number of MACs per vMAC to 8 or lower holds no advantage based on the network topologies that are described above. The implementation of a vMAC that includes 8 MACs doubles the latency available to the gather adder in each vMAC while also doubling the number of results produced per compute unit. However, this configuration also doubles the number of gather adders resulting in additional hardware that is unnecessary given the current trends in CNN model architecture. Theoretically, a single gather adder could be shared by two vMACs, thereby keeping the hardware cost the same as a vMAC that includes 16 individual MACs, but this would require extra routing and control logic while providing little benefit. While the embodiments of the accelerators 100 and 200 described herein operate most efficiently with 16 MACs in each vMAC, alternative vMAC embodiments can include a different gather adder implementation and include a larger or smaller number of MACs compared to the illustrative embodiments described herein.

Instruction Set

As described above, the accelerators 100 and 200 process convolutional layers, fully-connected layers and maxpool layers in various CNN models using the cooperative and independent operating modes. An embodiment of an instruction set that the accelerators 100 and 200 use to control the operation of various elements the control core 104 and the compute core 120 in one or more compute clusters 102 is provided below.

The accelerators 100 and 200 execute instructions that are 32 bits wide and are designed to process the traces of map data and kernel data described above. Instructions have a 4-bit operand code and most instructions use a fifth bit called the mode bit. The mode bit is used to distinguish behavior within a particular of instruction. The accelerators 100 and 200 process four types of instructions—data move, compute, branch and memory access instructions. Some types have both scalar and vector instructions. Both scalar and vector instructions use the general purpose registers as the source. Scalar instructions also use the registers as the destination. The destination for all vector instructions is the maps cache 132 or an external memory device in the case of the trace move instruction. Apart from the general purpose registers, there are a set of registers, one per compute unit that control the write-back address for the MAC and MAX instructions. Since the MAC and MAX values are produced in a strided pattern, the write-back addresses can be computed by a base address and offset pair. Every MAC trace instruction that results in a write-back increments the base address by the offset. The address value is sent along with the vector instruction to the trace decoders. This eliminates the need for a dedicated store instruction. Data is moved into these registers by a data move instruction.

The accelerators 100 and 200 execute both scalar and vector data move instructions. The scalar data move instructions (MOV) move data from the immediate field into a register (mode 0) or from one register to another (mode 1). In mode 1, MOV instructions also include a 5-bit shift field that allows the value in the source register to be left-shifted by up to 32. The vector data move instructions are of two types. The first is a trace move (TMOV) which moves a trace of up to 4096 words from the maps cache 132 to the external memory (mode 0), or in an inter-cache transfer from the maps cache 132 of one compute unit to the maps cache 132 of another compute unit (mode 1). The second is a vector move (VMOV) that moves one 256-bit cache line from the maps buffer to the registers that feed the multiply-accumulate units.

The accelerators 100 and 200 execute both scalar and vector compute instructions. Scalar compute instructions are the addition and multiplication instruction. For both instructions, mode 0 uses one source operand and an immediate value while mode 1 uses two source operands. The vector compute instructions are the MAC and MAX instructions. One of the source registers of the MAC instruction contains the start address of the maps trace while the second source register contains the start address of the weights trace. The immediate value provides the length of the trace. Mode 0 for the MAC instruction signals the vMACs to operate in INDP mode while mode 1 is for COOP mode. For the MAX instruction, only one source register is used which provides the start address for the maps trace. MAX instructions do not require access to the weights buffers and only have one computation mode.

The accelerators 100 and 200 execute three branch instructions—branch if greater than, branch if less than or equal to and branch if equal to. The two source registers provide the two values to be compared. The immediate value contains the offset from the current PC at which to branch to. A comparator in the ALU 114 of the control core 104 resolves the branch and the program counter is updated if the branch is taken. A branch instruction is followed by four branch delay slots. The decision to include branch delay slots was taken to avoid more complicated techniques like branch prediction. Branch delay slots also avoid the need to include logic that flushes the stages of the control core in the event that a branch is predicted incorrectly. Finally, most commonly encountered branches in a CNN layer can make use of at least 3 of the four delay slots.

The accelerators 100 and 200 execute both load and store memory access instructions, both of which are vector instructions. In the load instruction, one source register contains the start address of the trace in memory. The second source register contains two fields. The lower 23 bits contain the start address of the weights or maps buffer where the trace that is fetched is to be stored. The upper 9 bits are used to identify the destination buffer. 4 of the bits specify the compute unit while the other 5 bits specify the buffer ID within a compute unit. The store instruction writes a trace from the maps buffer to memory. In the store instruction, the first source register contains the memory address where the first word in the trace is to be stored. The second source register contains the maps buffer address of the trace and bits for selecting the target CU within the compute core. The immediate value in the instruction specifies the trace length.

Accelerator Computational Efficiency

The accelerators 100 and 200 improve the computational efficiency for processing different CNN models both by caching kernel traces and map traces for efficient use in the compute units 124 of one or more compute cores 120 and by providing the cooperative and independent operation modes for the vMACs 128A-128D in each compute unit 124 to enable efficient operation with convolutional layers and fully-connected layers of varying sizes. This enables the accelerators 100 and 200 to operate with improved efficiency over a wide range of CNN models and to process different convolutional layers and fully-connected layers within a CNN model that may have different dimensions with improved computational efficiency. As described above, the computational efficiency refers to the effective compute performance (often measured in billions of operations per second) compared to the theoretical compute performance of the underlying accelerator hardware.

An embodiment of the accelerator 100 that is configured with four compute units 124 in a single compute cluster using a Xilinx Zynq XC7Z045 device that incorporates an FPGA and two ARM cortex-A9 CPU cores in a single integrated circuit produced the results listed below. The platform uses 1 GB of DDR3 memory that is shared by the ARM cores and the FPGA as the external memory device that is connected to the memory interface 160. In this embodiment, the ARM cores only serve to initialize operation of the accelerator 100 and both the control core 104 and the compute core 120 with the compute units 124 are implemented using a specific configuration of the FPGA. This configuration of the accelerator 100 provides 128 kB in the maps cache 132 (maps buffer) and four vMACs, each with a 16 kB weights cache 136, for each of four compute units 124, which provides a total of 768 kB of on-chip trace cache memory.

FIG. 7A depicts a table 700 showing the execution time and computational efficiency for an embodiment of the accelerator 100 that executes the AlexNet CNN model. The total computational efficiency for execution of the AlexNet CNN model is approximately 94%. Of note is that the first layer (Layer #1) includes a noticeably lower efficiency level (69.87%) compared to the layers 2-5 that are all well above 90% efficiency. The reduced efficiency of the first layer is due to the fact that the dimensions of the first layer in AlexNet has an irregular kernel with dimension 3×11×11, which produces a trace length of 33, which is not a multiple of the cache line size (not a multiple of 16 bits for the 256-bit vectors in the traces of the accelerator 100). Consequently, the accelerator 100 processes the first layer in the independent operating mode, which results in a lower computational efficiency, while the accelerator processes the remaining layers 2-5 in the cooperative operating mode because these layers have dimensions that are multiples of 16. As described above, the accelerator 100 can process different layers of a single CNN model using different operating modes to improve the overall computational efficiency for processing the entire CNN model.

FIG. 7B depicts a table 720 of the computational efficiency of the accelerator 100 that executes the GoogLeNet CNN model. The total computational efficiency for execution of the GoogLeNet CNN model is approximately 91%. Once again, the accelerator 100 operates in the independent mode to perform the first layer in the GoogLeNet model, which produces a lower computational efficiency level than the remaining layers in the model. As depicted in the table 720, the accelerator 100 can execute the "inception" layers in the GoogLeNet CNN model.

Figure 7C:
FIG. 7C is a table that depicts performance and computational efficiency for an embodiment of the accelerators of FIG. 1 and FIG. 2 implementing the ResNet-50 CNN model.

FIG. 7C depicts a table 740 of the computational efficiency of the accelerator 100 that executes the ResNet-50 CNN model. The total computational efficiency for execution of the ResNet-50 CNN model is approximately 95%. Once again, the accelerator 100 operates in the independent mode to perform the first layer in the ResNet-50 model, which produces a lower computational efficiency level than the remaining layers in the model.

The accelerator 100 also provides improved computational efficiency compared to prior art CNN accelerator implementations. Of course, different embodiments of the accelerator 100 can have different peak performance levels, and the accelerator 200 of FIG. 2 that includes multiple compute clusters 102A-102N can provide a higher peak performance level than the single-cluster embodiment of FIG. 1 while providing similar levels of computational efficiency. Prior-art accelerators can also have different levels of theoretical compute performance based on the configuration of hardware for each accelerator. In particular, because CNNs are amenable to parallel processing, the theoretical compute capability of a hardware accelerator architecture can be increased by adding additional hardware execution units. The computational efficiency metric enables comparison of the efficiency of operation of embodiments of the CNN accelerators 100 and 200 compared to prior-art CNN accelerators even though the embodiment of the CNN accelerator 100 described herein often has a different theoretical compute capacity compared to prior-art CNN accelerator implementations.

FIG. 8 depicts a comparison table 800 that uses an embodiment of the accelerator 100 with a total of 256 MACs (16 vMACs with 16 MACs each), an operating clock speed of 250 MHz, and a theoretical peak performance level of 128 giga-operations per second. The results for the accelerator 100 are shown in the columns 808 compared to prior-art accelerator implementations including "Eyriss," "Zhang," "Caffeine," "Qiu," and "HWCE". The row 804 depicts the computational efficiency for the prior-art accelerators and the accelerator 100. The table 800 depicts results from the prior-art accelerators using both the AlexNet CNN model (also shown for the accelerator 100) and the "VGG" CNN model, which is another CNN model that also uses the "conventional" layer types used in AlexNet, and these CNN models are similar to each other. As depicted in row 804 of the table 800, the accelerator 100 provides >90% computational efficiency in the AlexNet, GoogLeNet, and ResNet-50 CNN models while the prior-art accelerator solutions provide less than 90% computational efficiency in the AlexNet or VGG CNN models. As such, the accelerator embodiments described herein provide improvements to computational efficiency in CNN models compared to the prior art.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. An accelerator for processing of a convolutional neural network (CNN) comprising:
    a compute core comprising:
        a plurality of compute units, each compute unit comprising:
            a first memory cache configured to store a map trace arranged as a plurality of cache lines each having at least one vector, the map trace corresponding to a contiguous set of input data in an input map for one layer of the CNN;
            a second memory cache configured to store at least one vector in a kernel trace, the kernel trace corresponding to a contiguous set of weights in a kernel of a convolutional layer or a fully-connected layer of the CNN;
            a plurality of vector multiply-accumulate units (vMACs) connected to the first memory cache and the second memory cache, each vMAC comprising a plurality of multiply-accumulate units (MACs), each MAC including a multiplier unit configured to, for each of a plurality of cycles of the plurality of vMACs, multiply a first word that forms a portion of the at least one vector of a respective cache line of the plurality of cache lines in the map trace in the first memory cache by a second word that forms a portion of the at least one vector in the kernel trace in the second memory cache to produce an intermediate product, and an adder unit that, for each of the plurality of cycles of the plurality of vMACs, adds the intermediate product to a third word to generate a sum of the intermediate product and the third word as an output; and
            a trace decoder configured to (i) receive a trace instruction that identifies an operating mode of the compute core, a start address of the map trace, and a length of the map trace and (ii) based on the trace instruction, for each of the plurality of cycles of the plurality of vMACs, increment the start address, fetch the respective cache line from the plurality of cache lines in the first memory cache, and forward the respective cache line to the plurality of vMACs depending on the operating mode of the compute core, until the length of the map trace is reached; and
    a control core operatively connected to the plurality of compute units in the compute core, the control core being configured to provide the trace instruction to the trace decoder, the control core being configured to select the operating mode of the compute core depending on a number of input maps to the convolutional layer of the CNN and control operation of the plurality of compute units according to the selected operating mode, the operating mode being either one of a cooperative mode and an independent mode, the cooperative mode being selected in response to the number of input maps to the convolutional layer of the CNN being a multiple of 16, the independent mode being selected in response to the number of input maps to the convolutional layer of the CNN not being a multiple of 16,
    wherein, in the cooperative mode, each MAC in the plurality of MACs in at least one of the plurality of vMACs in each compute unit receives the first word from a different portion of the map trace, and
    wherein, in the independent mode, each MAC in the plurality of MACs in at least one of the plurality of vMACs in each compute unit receives the first word from a single portion of the map trace.

2. The accelerator of claim 1, each vMAC further comprising:
    a shift register connected to outputs of the plurality of MACs, the shift register being configured to generate a series of outputs, each output in the series of outputs corresponding to an output of one MAC in the plurality of MACs; and
    a gather adder configured to generate one of:
        a single sum of the series of outputs of the shift register and a bias value as an output; or
        a plurality of sums, each sum in the plurality of sums corresponding to a sum of an output of one MAC in the plurality of MACs received from the shift register and another bias value.

3. The accelerator of claim 1, each compute unit in the plurality of compute units further comprising:
    a vector maxpool unit (vMAX) connected to the first memory cache of the compute unit, the vMAX comprising a plurality of comparators that implement a max pooling layer of the CNN based on outputs from the plurality of vMACs that are stored in the first memory cache of the compute unit.

4. The accelerator of claim 1 further comprising:
    a memory interface; and
    a compute cluster connected to the memory interface, the compute cluster comprising:
        the compute core;
        a data distribution network; and
        the control core, the control core being operatively connected to the data distribution network.

5. The accelerator of claim 1 wherein the first memory cache in each compute unit is implemented as a first scratchpad memory device in the compute core and the second memory cache in each compute unit is implemented as a second scratchpad memory device.

6. The accelerator of claim 1, wherein each compute unit in the plurality of compute units further comprises four vMACs and each vMAC further comprises sixteen MACs.

7. The accelerator of claim 6, wherein a first vMAC in the plurality of vMACs reads 256-bits of data as the at least one vector of the respective cache line in the map trace from the first memory cache and each MAC in the plurality of MACs in the first vMAC receives a 16-bit first word from the 256-bits of data.

8. The accelerator of claim 1 wherein the first memory cache stores 256 kB of map trace data and the second memory cache stores 32 kB of kernel trace data.

9. The accelerator of claim 1 further comprising:
    a single memory cache that is the first memory cache in each compute unit in the plurality of compute units in the compute core, the single memory cache being shared by the plurality of compute units.

10. The accelerator of claim 9 wherein the compute core further comprises four compute units.

11. The accelerator of claim 9 wherein the single memory cache stores 512 kB of the map trace data.

12. A method of operating an accelerator for processing of a convolutional neural network (CNN) comprising:

loading, with a control core in the accelerator, a map trace into a first memory cache in a compute core in the accelerator, the map trace being arranged as a plurality of cache lines each having at least one vector, the map trace corresponding to a contiguous set of input data in a plurality of input maps for one layer of the CNN;

loading, with the control core, at least one vector in a kernel trace into a second memory cache in the compute core in the accelerator, the kernel trace including a plurality of vectors of weight values corresponding to a contiguous set of weights in a kernel of a convolutional layer or a fully-connected layer of the CNN;

providing, with the control core, a trace instruction to a trace decoder, the trace instruction identifying an operating mode of the compute core, a start address of the map trace, and a length of the map trace;

operating a plurality of multiply-accumulate units (MACs) in a plurality of vector multiply-accumulate units (vMACs) in the compute core that are connected to the first memory cache and the second memory cache to implement a portion of the convolutional layer or the fully-connected layer in the CNN, the operating of each MAC further comprising, for each of a plurality of cycles of the plurality of vMACs:

multiplying, with a multiplier unit in the MAC, a first word that forms a portion of the at least one vector of a respective cache line of the plurality of cache lines in the map trace in the first memory cache by a second word that forms a portion of the at least one vector in the kernel trace in the second memory cache to produce an intermediate product, and adding, with an adder unit in the MAC, the intermediate product to a third word to generate a sum of the intermediate product and the third word as an output;

operating the trace decoder to, based on the trace instruction, for each of the plurality of cycles of the plurality of vMACs, increment the start address of the map trace, fetch the respective cache line from the plurality of cache lines in the first memory cache, and forward the respective cache line to the plurality of vMACs depending on the operating mode of the compute core, until the length of the map trace is reached;

selecting, with the control core, the operating mode of the compute core depending on a number of input maps to the convolutional layer of the CNN, the operating mode being either one of a cooperative mode and an independent mode, the cooperative mode being selected in response to the number of input maps to the convolutional layer of the CNN being a multiple of 16, the independent mode being selected in response to the number of input maps to the convolutional layer of the CNN not being a multiple of 16;

operating, with the control core, the plurality of MACs in the cooperative mode in which each MAC receives the first word from a different portion of the map trace; and operating, with the control core, the plurality of MACs in the independent mode in which each MAC receives the first word from a single portion of the map trace.

13. The method of claim 12 further comprising:

operating a plurality of comparators in a vector maxpool unit (vMAX) in the compute core, the vMAX that receive outputs from the plurality of vMACs that are stored in the first memory cache to implement a max pooling layer of the CNN.

* * * * *